United States Patent
Rausch et al.

(10) Patent No.: US 12,373,108 B1
(45) Date of Patent: Jul. 29, 2025

(54) OPTIMIZED HOST-SIDE STORAGE QUEUES

(71) Applicant: Amazon Technologies, Inc., Seattle, WA (US)

(72) Inventors: Tim Rausch, Issaquah, WA (US); Andrew Kent Warfield, Vancouver (CA); Martine Bruce Wedlake, Kent, WA (US); Andrew C Schleit, Seattle, WA (US); Joshua John Buergel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/622,629

(22) Filed: Mar. 29, 2024

(51) Int. Cl.
*G06F 3/06* (2006.01)

(52) U.S. Cl.
CPC .......... *G06F 3/0611* (2013.01); *G06F 3/0659* (2013.01); *G06F 3/0676* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 7,734,837 B2 | 6/2010 | Hendel et al. | |
| 9,575,664 B2 | 2/2017 | Chen et al. | |
| 9,600,205 B1* | 3/2017 | Nowell | G06F 3/0659 |
| 9,911,494 B1* | 3/2018 | Bandic | G11C 13/0097 |
| 2016/0299686 A1* | 10/2016 | Nagashima | G06F 3/0676 |
| 2024/0289052 A1* | 8/2024 | Parry | G06F 3/0679 |

FOREIGN PATENT DOCUMENTS

KR   100927190   10/2009

* cited by examiner

*Primary Examiner* — Khoa D Doan
(74) *Attorney, Agent, or Firm* — S. Scott Foster; Kowert, Hood, Munyon, Rankin & Goetzel, P.C.

(57) ABSTRACT

Systems and methods for implementing optimized host-side device-specific queues for a storage device are described. A host system may implement a host-side queue for a storage device that is optimized using device-specific parameters. When an access request to the storage device is received, the request may be enqueued in an order optimized according to parameters of the storage device. Requests are then sent to the device in an optimized order. Optimization parameters may be provided by the manufacturer and read by the host system from the device, the parameters including physical device geometry and runtime telemetry data. In some embodiments, queue ordering for the host-side queue may be supplied by the storage device.

20 Claims, 11 Drawing Sheets

OPTIMIZED HOST-SIDE STORAGE QUEUES

BACKGROUND

Mechanical storage devices such as hard disk drives (HDDs) remain a popular choice for storing bulk data, particularly in the context of cloud data services. Performance of these devices, as measured by input and output operations per second (IOPS) and command latency (time for a command to complete), is limited by the mechanical properties of the devices. Data is read or written by a head that is magnetically coupled to a spinning platter which contains the data, the head positioned by a connected actuator via an actuator arm. As such, time to access the data for a particular access is variable, leading to opportunities to improve performance through careful ordering of IO operations. While storage devices themselves implement operation reordering to take advantage of these opportunities, storage devices are generally limited in the amount operations they can process simultaneously.

Figure 1:
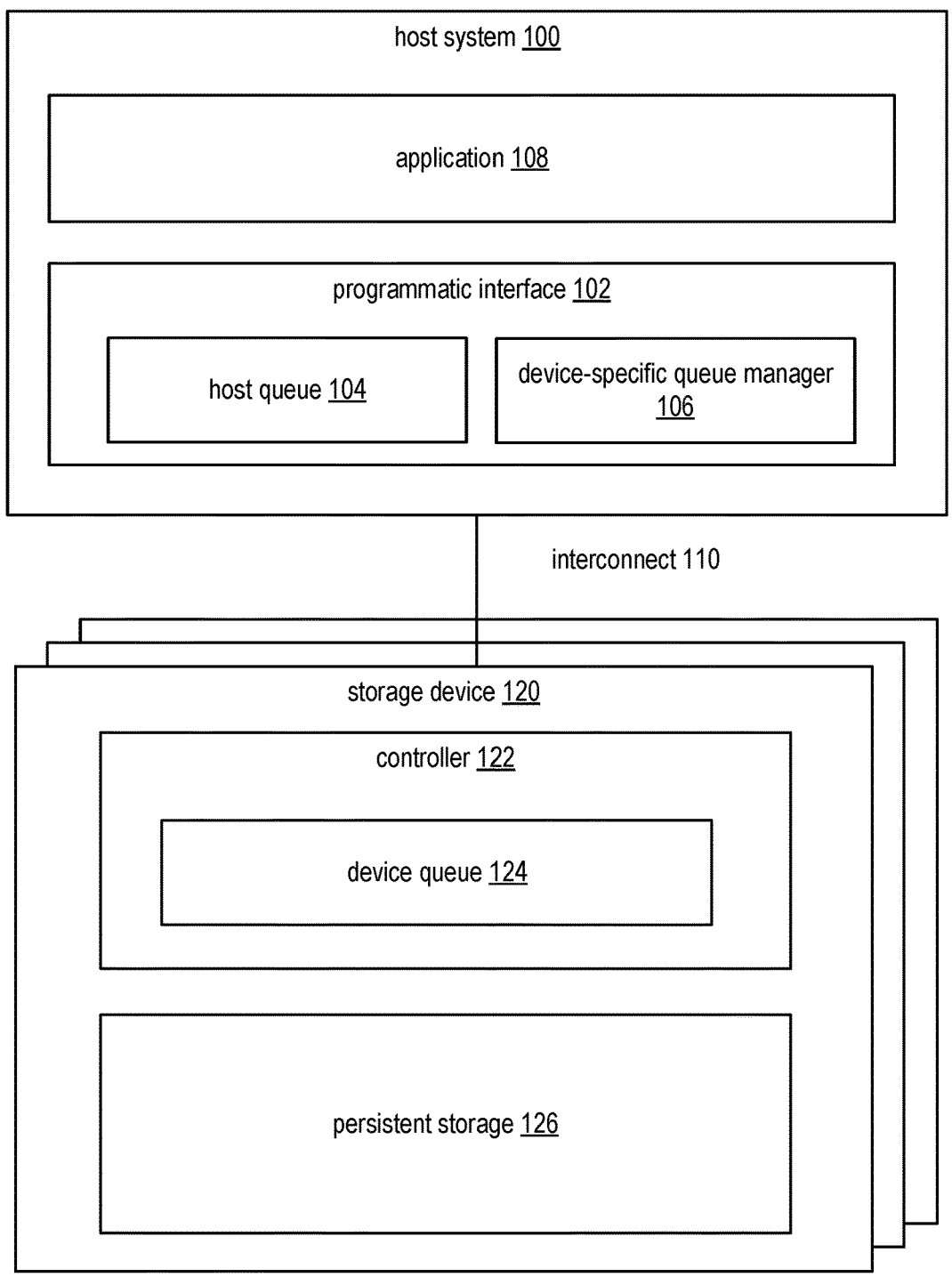
FIG. 1 is a logical block diagram of a host computer system implementing optimized device-specific queues for a storage device, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Mechanical storage devices such as hard disk drives (HDDs) remain a popular choice for storing bulk data, particularly in the context of cloud data services. Performance of these devices, as measured by input and output operations per second (IOPS) and command latency (time for a command to complete) is limited by the mechanical properties of the devices. Data is read or written by a head that is magnetically coupled to a spinning platter which contains the data, the head positioned by an actuator via an actuator arm. See FIG. 3 below for further details. When data is read or write at a specific location on the device, the actuator moves the head to the radius of interest and then waits until the desired location on the media rotates under the head. The time to read or write is therefore limited by the time it takes the actuator to move the head (seek time) and the time needed at the correct radius for the data to come under the head (rotational latency). As such, time to access the data for a particular access is variable, leading to opportunities to improve performance through careful ordering of IO operations. Furthermore, in systems with many disk drives, performance of data reads and writes may involve the performance of IO operations on many disk drives leading to data access latencies governed by the access latencies of the least responsive drives, thus managing of long latency tails of individual IO operations becomes increasingly important.

Internal to a storage device is a small amount of memory. Firmware executing in the device will accept operations from a host system and cache these operations in the memory. The firmware will schedule the operations in its memory in a manner which minimizes the actuator seek time and rotational latency. However, as a number of operations in the memory (known as queue depth) increases, average completion latency grows and deviation increases, as discussed below in FIG. 4. Therefore, while storage devices may implement operation reordering to take advantage of these performance opportunities, storage devices are generally limited in the amount operations they can process simultaneously due to limited internal resources and performance constraints.

A system may support several simultaneous workloads on a storage device. In addition to customer/user workloads which may be unpredictable, a system may, for example, support data integrity workloads such as data reconstruction and verification, garbage collection workloads and metadata update workloads. While these system workloads may be predictable, performing these system operations opportunistically is only possible if the operations are queued and sorted for performance in the drive, leading to increased latency and potential access time costs to the customer/user workload.

Disclosed herein are systems and methods for implementing optimized host-side device-specific queues for a storage device. A host system may implement a host-side queue for a storage device that is optimized using device-specific parameters. When an access request to the storage device is received, the request may be enqueued in an order optimized according to parameters of the storage device. Requests are then sent to the device in an optimized order. Optimization parameters may be provided by the manufacturer and read by the host system from the device, the parameters including physical device geometry and runtime telemetry data. In some embodiments, queue ordering for the host-side queue may be supplied by the storage device. These disclosed systems and methods may enable effective device queues of hundreds or thousands of requests rather than a mere tens of requests typical of the devices themselves, all while supporting optimal ordering that is device-specific and effectively managing access latencies.

FIG. 1 is a logical block diagram of a host computer system implementing optimized device-specific queues for a storage device, according to some embodiments. A host system 100 may connect to one or more storage devices including the storage device 120 through an interconnect 110. The storage device 120 may be any type of persistent data store that has performance characteristics dependent on a sequence of access to data, such as is the case for rotating media data storage. Examples of such storage devices are hard disk drives, although any storage device with performance benefiting from device-specific access ordered may be envisioned. The interconnect 110 may be any form of storage interconnect such as Advanced Technology Attachment (ATA), Serial ATA (SATA), Small Computer System Interface (SCSI), Serial Attached SCSI (SAS), Internet SCSI (iSCSI) or the like. These are merely examples of interfaces and are not intended to be limiting.

The host system may be implemented using any manner of computer system as discussed below in FIG. 11. The host system 100 may provide a programmatic interface 102 to provide access to the storage device 120 for input-output (IO) operations. In some embodiments, the programmatic interface 102 may provide access to the storage device 120 for an application 108, the programmatic interface taking the form of one or more application programmer interfaces (APIs). In some embodiments, the programmatic interface 102 may take the form of storage device driver while in other embodiments the programmatic interface 102 may be implement a virtual storage device. These examples are not intended to be limiting and various forms of the programmatic interface 102 may be envisioned.

In some embodiments, the application may implement functions that require local data storage, such as database or data store applications. In some embodiments, these applications may provide data storage or database functionality as a network-based services, such as a service of a provider network as discussed further below in FIG. 11. In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("REST-ful") techniques rather than message-based techniques. For example, a network-based service implemented according to a RESTful technique may be invoked through parameters included within an HTTP method such as PUT, GET, or DELETE, rather than encapsulated within a SOAP message.

The storage device 120 may include persistent storage 126 such as through the use of rotating magnetic media, with this rotating media having performance characteristics that are dependent on an order of IO accesses submitted to the device. To provide access through the interconnect 110 and to manage the persistent storage 126, the storage device 120 may include a controller 122 that implements a local device queue 124. The various components of the storage device 120 are discussed in further detail below in FIG. 3.

As the device queue 124 may be of limited size for reasons discussed below, the host may implement a host-side queue 104 that is managed by a device-specific queue manager 106. In some embodiments the host queue may of practically unlimited size, depending on the needs of the application 108. The device-specific queue manager may manage the host queue 104 according to device-specific parameters such that IO operations performed by the storage device 120 are performed in an order that matches an order of operations that would result if the storage device managed the host queue directly. In various embodiments, the device-specific queue manager may manage the host queue 104 using one or more parameters or criteria provided by the manufacturer of the storage device. Examples of such parameters may include storage layout information such as descriptions of storage zones and include access performance information such as transfer rates, rotational speeds and various seek and settling latencies. In other embodiments, such parameters may be obtained from the storage device 120 and may include, in addition to the types of information described above, additional data such as bad sector remapping information, error information, data channel error or failure information, drive background task activity, environmental data and power data. In yet other embodiments, the device-specific queue manager may coordinate with the storage device 120 using programmatic extensions over the interconnect 110 to enable the storage device 120 to direct the management of the host queue 104, as discussed further below.

Figure 2A:
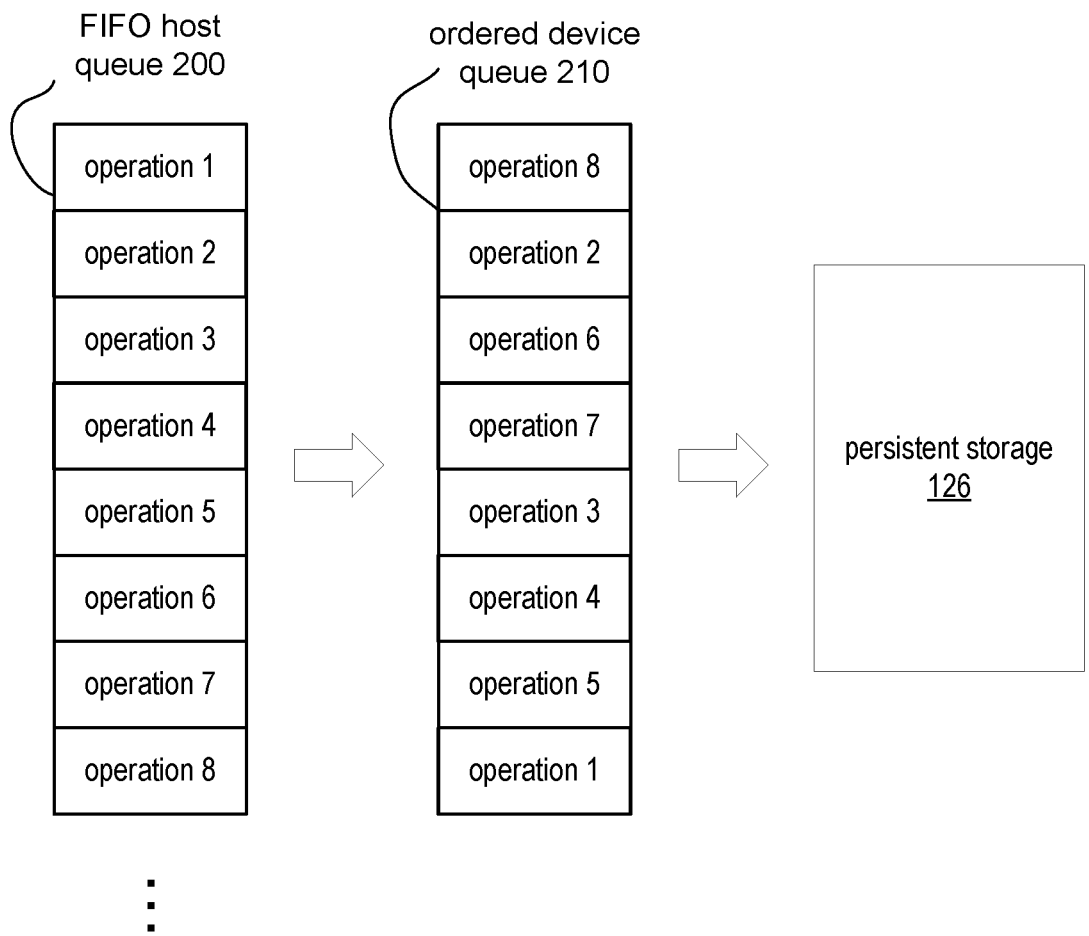
FIGS. 2A-2B are logical block diagrams illustrating command reordering between host and device queues, according to some embodiments.
Figure 2B:
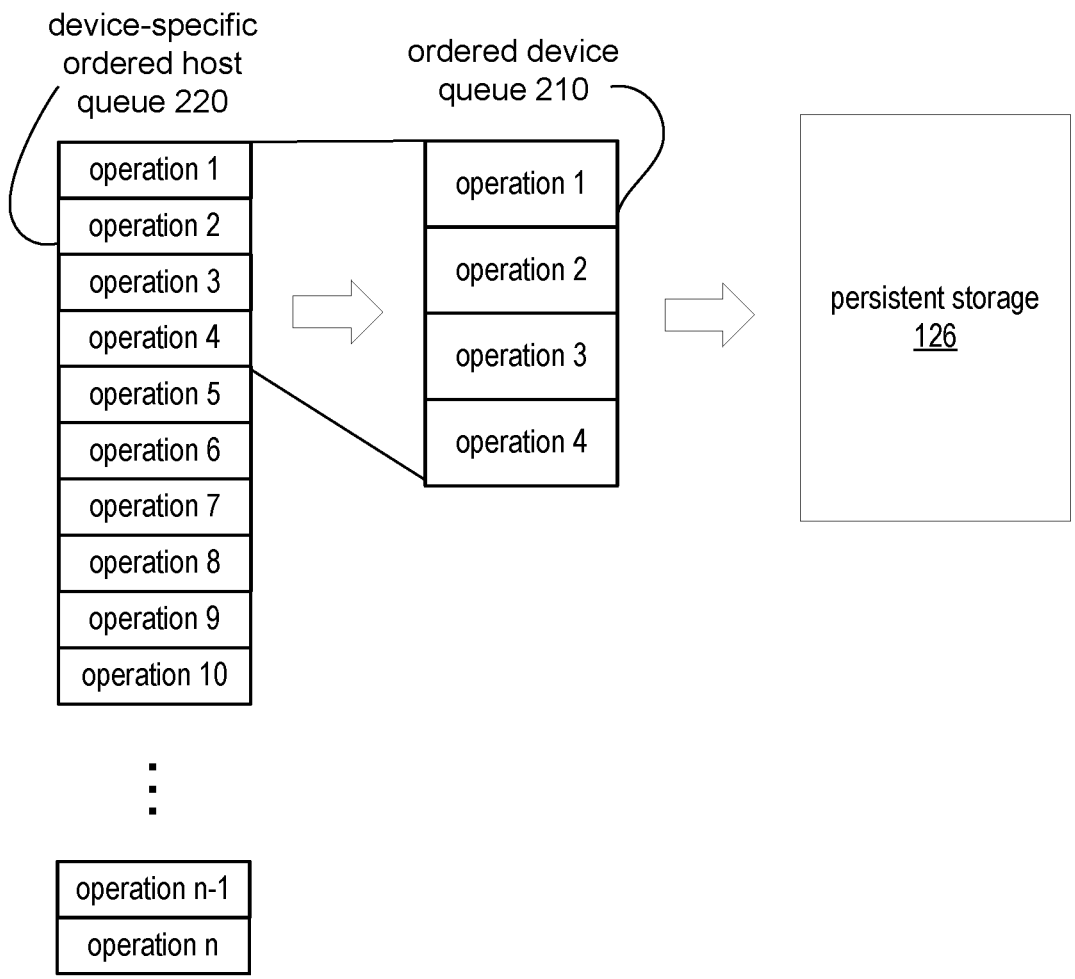

FIGS. 2A-2B are logical block diagrams illustrating command reorderingd between host and device queues, according to some embodiments. In a simplified example, a host queue and device queue are implemented, each including 8 commands. As shown in FIG. 2A, the host queue 200 may be conventionally ordered as a First-In-First-Out (FIFO) queue containing operations from the programmatic interface in arrival order. The storage device will then reorder the operations in ordered device queue 210 to put them in the order which minimizes power, rotational latency and seek time. Operation 1, which was first to arrive in the host queue, will be the last to return its data and will have the longest latency. Operation 8 which was the last in the host queue, will be the first to return data and will have the shortest latency. The latency will be different for each operation. An analysis of queue depth and performance impact for the example in FIG. 2A is provided below in FIG. 3.

As shown in FIG. 2B, the host queue 220 may implement device-specific ordering. The storage device will therefore not reorder the operations in ordered device queue 210 as they are already in an order which minimizes power, rotational latency and seek time. While latency will remain different for each operation, more predictable latency will be achieved from the storage device with maximum IOPS.

Furthermore, the device-specific ordered host queue 220 may implement queue depths far in excess of the device queue 210, further enhancing performance and throughput. As shown, a device-specific host queue 220 may implement tens, hundreds or even thousands of queued requests while the ordered device queue may be seen as have a smaller window of queue requests in process in the storage device. Furthermore, as optimal ordering is implemented for the device within the device-specific ordered host queue 220, a total size of the ordered device queue 210 may be reduced to improve access latencies, in some embodiments.

Figure 3:
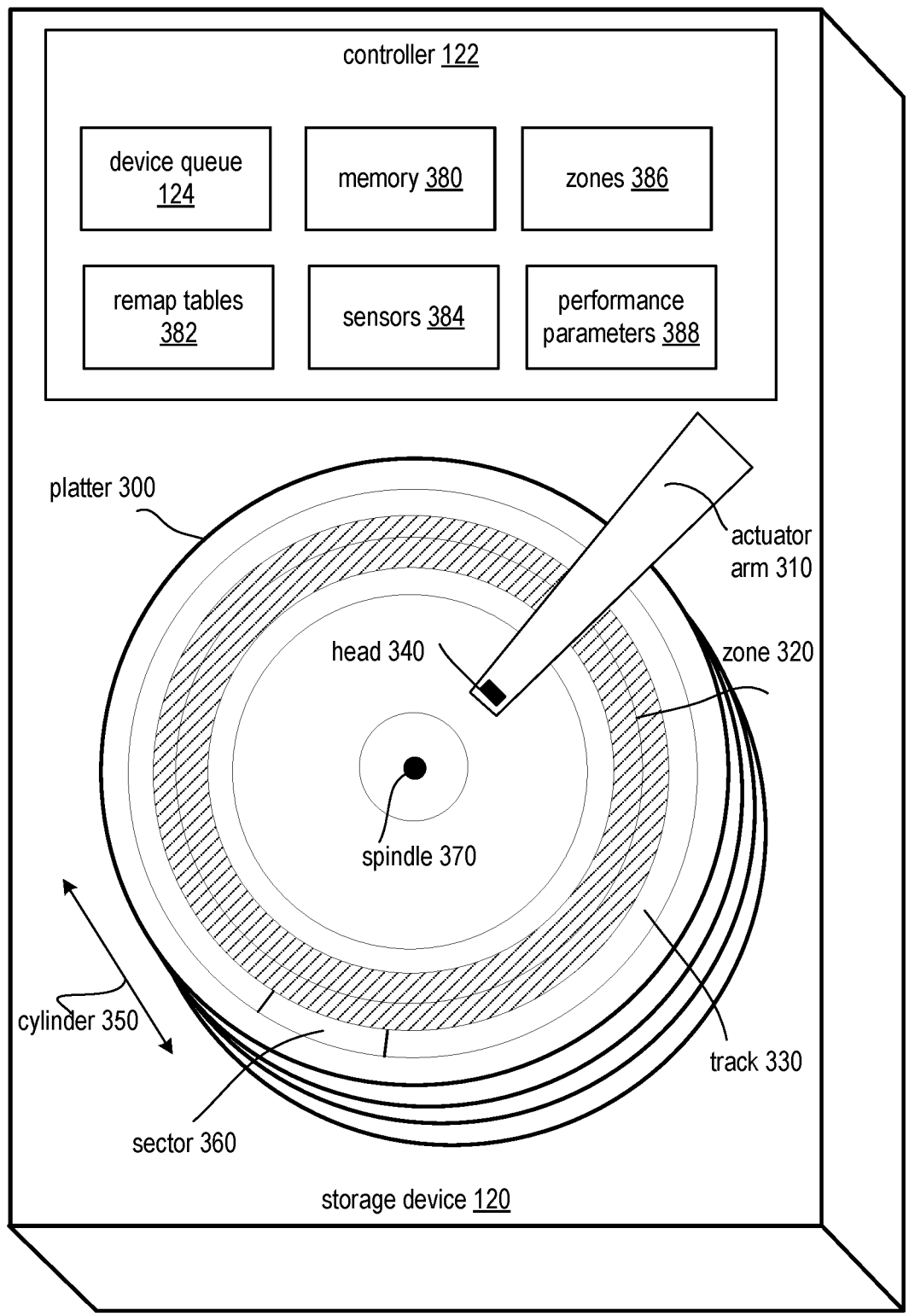
FIG. 3 is a logical block diagram of a storage device, according to some embodiments.

FIG. 3 is a logical block diagram of a storage device, according to some embodiments. A Hard Disk Drive (HDD) is a type of storage device where IO operations per second (IOPS) and command latency, or time for commands to complete, are limited by mechanical ability. Data is written and read by a head 340 which flies over spinning platter 300 which contains persistent data. The head is connected to an actuator via an actuator arm 310. When data is read or written at a specific location on the disk, the actuator moves the head to the radius of interest and then waits until the desired location on the media rotates under the head. The time to read or write is therefore limited by the time it takes the actuator to move the head (seek time) and the time we have to wait at the correct radius for the data to come under the head (rotational latency).

Multiple platters 300 collectively rotate around a common spindle 370. On a single platter 300, data is organized on a series of concentric tracks 330, with a single track of multiple platters defining a cylinder 350. Each track is subdivided into multiple sectors 360. As outer tracks have correspondingly greater linear distances than inner tracks, to efficiently use storage capacity a variable number of sectors per track is typically employed. An HDD may implement multiple zones 320 with each zone including a number of tracks, and therefore cylinders, with a common number of sectors per track.

When accesses switch between tracks, the hard drive imposes, in additional to a rotational latency, a head settling time or latency. When accesses switch between cylinders, in addition to track access latencies the hard drive additionally imposes a seek latency. When accesses switch between sectors of a same track, the hard drive imposes a rotational latency. Generally speaking each IO access suffers a cumulative access latency, along with a transfer latency, that include all of these latency components. As access latencies may be highly variable, ordering of IO accesses may have a profound effect on throughput of the storage device 120.

Internal to the HDD is a controller 122 that includes a memory 380 and a device queue 124 HDD firmware will accept operations from a host system and enqueue these operations in the device queue 124. The HDD firmware will then schedule the operations in its queue in a manner which minimizes the actuator seek time and rotational latency. The ordering of this enqueuing may be determined by a number of operating parameters, including zone information 386, performance parameters 388 such as seek, settling and rotational latencies, transfer latencies and power consumption information, as well as data from sensors 384. In addition, the drive may include a number of bad sectors or defective components such as data channels or heads, and may grow additional bad sectors over time. These flaws are common for rotational storage media and may, in some embodiments, be managed using remap tables 382. As modern disk storage devices are accessed using a technique known as logical block addressing (LBA), host systems, such as the host system 100 of FIG. 1, may know nothing about the specific performance of the storage device 120 and may only optimize host-side queues using LBA sorting. Thus, fundamental data layout from zones 386, sector remapping as described by remap tables 382, environmental data from sensors 384 and real-time locational data of performance parameters 388 may be useful in optimizing a host-side queue but are traditionally unavailable for that purpose.

Figure 4:
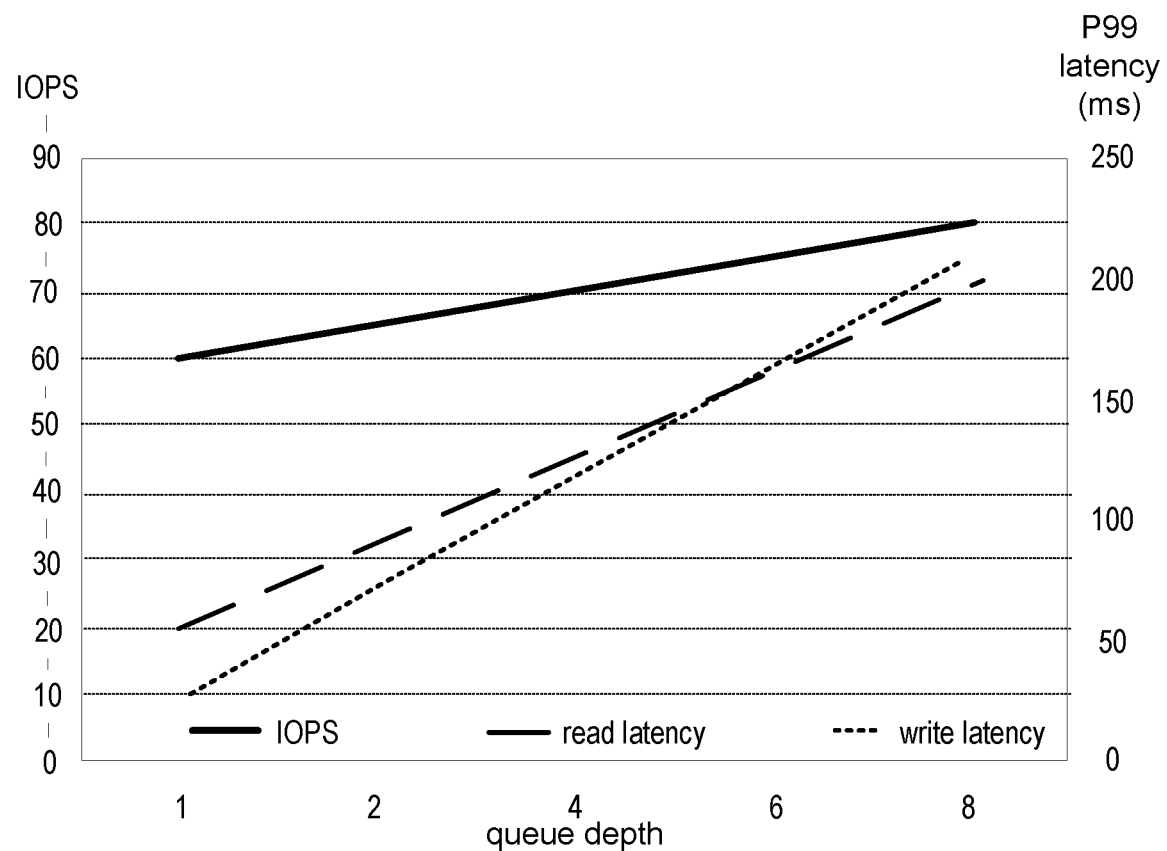
FIG. 4 is a graph demonstrating a typical relationship between queue depths and performance characteristics of a storage device, according to some embodiments.

FIG. 4 is a graph demonstrating a typical relationship between queue depths and performance characteristics of a storage device, according to some embodiments. The graph shows IOPS and ninety-ninth percentile (P99) command latency for a hard disk drive driving with write caching disabled and running a reference workload with read priority disabled. By increasing the queue depth from one to eight there is a thirty-four percent increase in IOPS but three hundred percent and five hundred-fifty percent respective increases in P99 latency for reads and writes respectively. A host may not know which operation will be a long latency operation and system performance is often limited by the long latency tails of the operation distribution.

Figure 5:
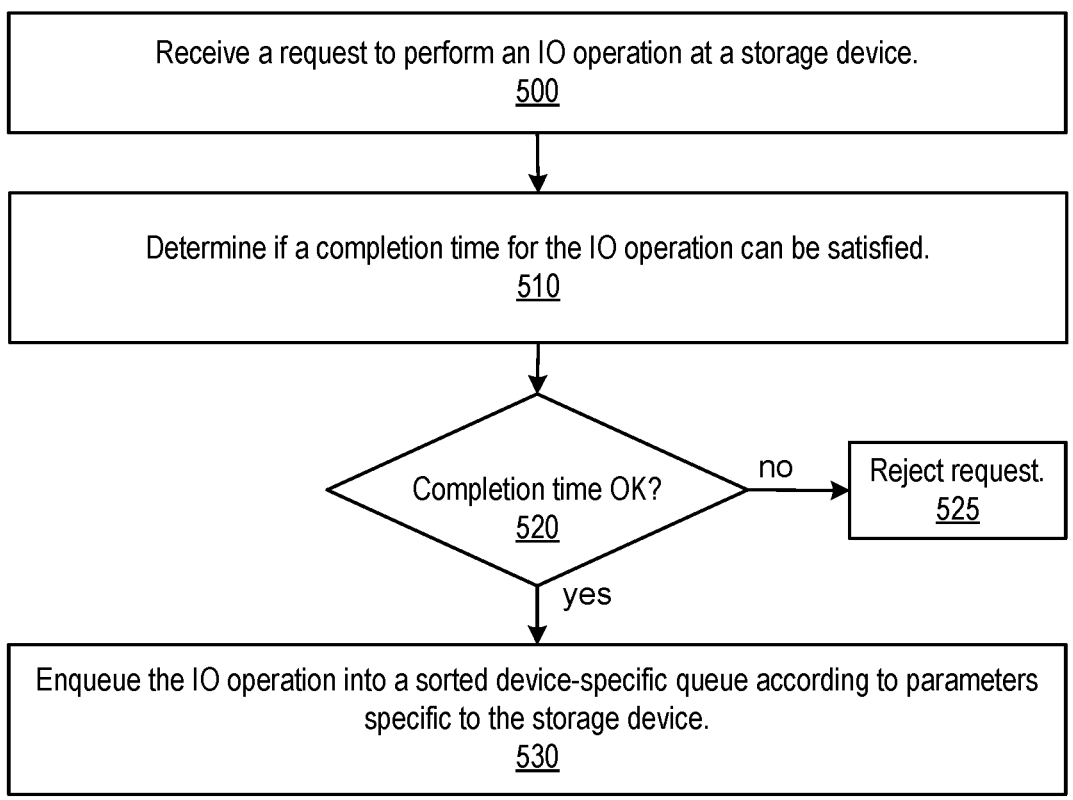
FIG. 5 is a high-level flow chart that illustrates various methods and techniques implementing sending of input-output requests in a host-side device-specific queue to a storage device, according to some embodiments.

FIG. 5 is a high-level flow chart that illustrates various methods and techniques implementing enqueuing of input-output requests to a host-side device-specific queue for a storage device, according to some embodiments. The process begins at 500 where a request may be received to perform an IO operation at a storage device, such as the storage device 120 of FIG. 1, in some embodiments. First, as shown in 510, it may be determined if a completion time for the IO operation may be satisfied. This completion time may be specified in the IO request, may be defined according to the application requesting the operation, or may be defined according to a particular programmatic interface, such as the programmatic interface 102 of FIG. 1, over which the request is received, in various embodiments. These are merely examples of completion time definitions and are not intended to be limiting. A projected completion time may be determined according to a current contents of a host-side device-specific queue for the storage device, priorities of respective queued IO requests as well as device-specific parameters for the storage device. Example of device-specific parameters affecting projected completion time may be current location data and remap information, in some embodiments. These examples are not intended to be limiting and various other examples of parameters affecting completion time may be contemplated.

If the projected completion may not satisfy a completion time requirement for the request, as shown in a negative exit in 520, the process may reject the request as shown in 525. If the projected completion may satisfy a completion time requirement for the request, as shown in a positive exit in 520, the process may advance to step 530 where the IO operation is enqueued in a host-side device-specific queue according to one or more parameters or criteria specific to the storage device. Enqueuing of IO operations is discussed in further detail below in FIGS. 7 and 8.

Figure 6:
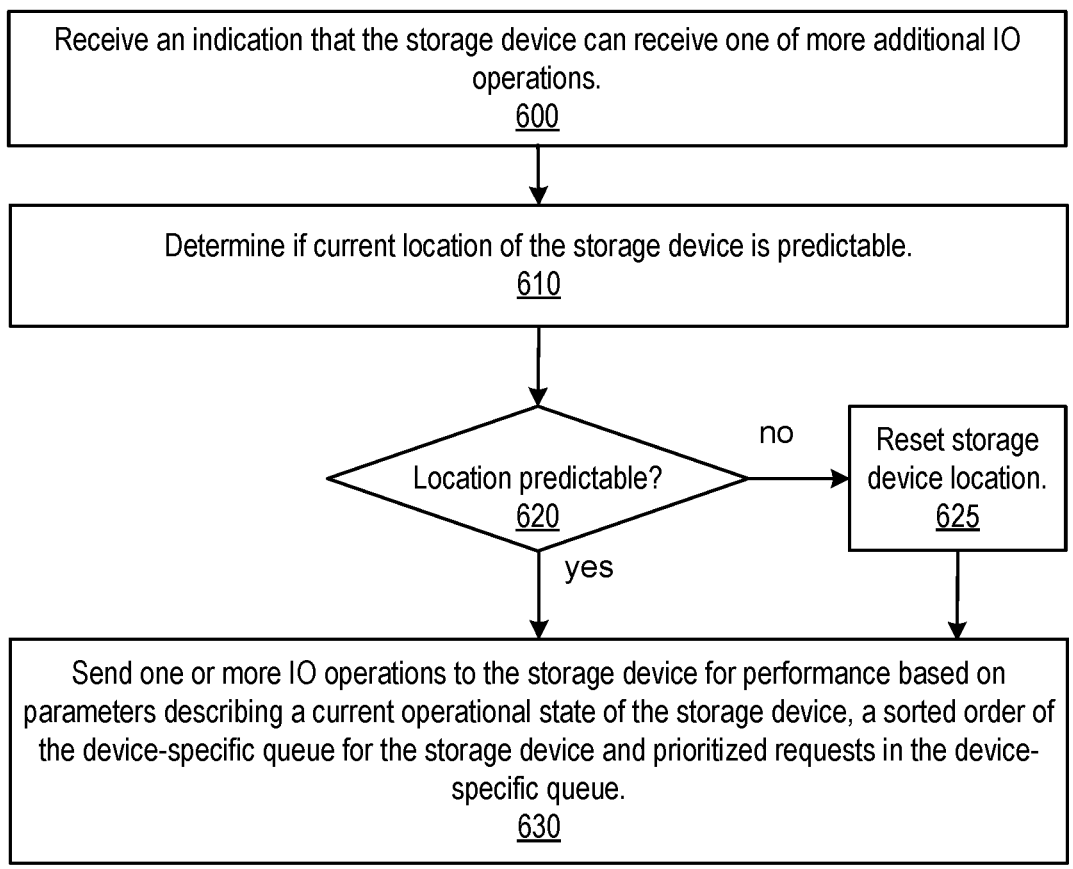
FIG. 6 is a high-level flow chart that illustrates various methods and techniques implementing dequeuing of input-output requests to a host-side device-specific queue for a storage device, according to some embodiments.

FIG. 6 is a high-level flow chart that illustrates various methods and techniques implementing sending of input-output requests in a host-side device-specific queue to a storage device, according to some embodiments. The process begins at 600 where a notification may be received indicating that a storage device, such as the storage device 120 of FIG. 1, is able to receive one or more additional IO operations in a host-side device-specific queue, such as the host queue 104 as shown in FIG. 1, in some embodiments. This notification may be implemented in various forms. In one embodiment, a notification may be derived from a completion of a previous IO request, indicating that the storage device may have fewer than a desired number of IO operations in its device queue, such as the device queue 124 of FIG. 1. In other embodiments, the notification may be initiated by the storage device as an indication that it has fewer than a desired number of IO operations for optimal performance. In still other embodiments, an indication may be made according to one or more parameters of the storage device, such as a thermal measurements, vibration measurements, or power consumption measurements, or as a result of host-side disk simulation in combination with periodically updated operational state provided by the disk drive. These examples are not intended to be limiting and any means of determine a requirement to send IO operations from a host queue to a storage device may be implemented, in various embodiments.

Then, as shown in 610, it may be determined if a current location of the storage device is predictable. During operation, a host may determine a current location of storage access of a storage device, including current track and rotational position, based on positional information of the device or completion information of previous IO requests. However, such a determination or prediction may be unable to be made, for example in the case where a state of the storage device is not known due to lack of initialization of the storage device, a detected error of the storage device or a period of time elapsed since a previous established known state. These are merely examples of reasons that a current prediction of current location may not be possible and are not intended to be limiting.

If the current location is predictable, as shown in a positive exit in 620, the process may advance to step 630. If the current location is not predictable, as shown in a positive exit in 620, the process may advance to 625 where the current location of the storage may be established or reset. In some embodiments, this may be accomplished by sending an IO operation dedicated to establishing a known position for the storage device. In other embodiments this may include sending an IO access to a known storage location, such as logical block address (LBA) zero. In still other embodiments, multiple successive accesses to a known storage location, such as LBA zero, may be sent. Finally, in some embodiments, the storage device may first be set to an idle state and then accesses to a known storage location, such as LBA zero, may be sent. These are merely examples and many ways of establishing a predictable location of the storage device may be imagined. Once a current location of the storage device is predictable, the process may advance to step 630.

As shown in 630, one or more IO operations may be sent to the storage device, the IO operations chosen from the host queue based on predicted location determined from the current operational state of the storage device and the sorted order of the device-specific host-side queue for the storage device, in various embodiments. In some embodiments, an updated state of the storage device may result in a predicted location that may cause a reordering of the host queue either through a resorting of the queue or an updating of a first chosen IO operation to send to the storage device. In addition, differing request priorities within the host-side queue may be used to optimize selection of IO operations to be sent, balancing overall throughput of the storage device and completion latencies of high priority operations.

Figure 7:
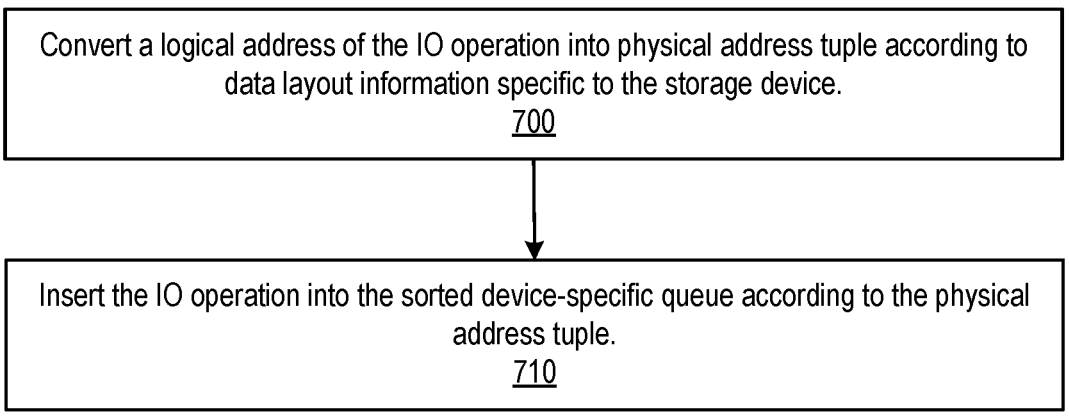
FIG. 7 is a high-level flow chart that illustrates various methods and techniques implementing inserting an input-output request into a host-side device-specific queue for a storage device, according to some embodiments.

FIG. 7 is a high-level flow chart that illustrates various methods and techniques implementing inserting an input-output (IO) request into a host-side device-specific queue for a storage device, according to some embodiments. As shown in step 700, a logical address of the IO request may first be converted into a physical address tuple according to data layout information for the storage device, such as the storage device 120 of FIG. 1. As discussed above in FIG. 3, a rotating magnetic media device may be organized into cylinders (collections of tracks across multiple platters), platters, and sectors. To identify a particular location, A cylinder number, head (platter) number and sector number are commonly used, giving rise to a <C,H,S>, or CHS, address tuple. Determination of a physical CHS value may be enabled using zoning information, such as zones 386 of FIG. 3, as well as remapping information, such as remap tables 382 of FIG. 3. It should be noted that the presence of remapping information may cause the translation of an LBA address, along with an IO operation length, to be translated into several, discontinuous CHS tuples and give rise to a potential performance degradation condition that may affect rejection of an IO request in step 525 of FIG. 5.

Once CHS tuple(s) for an IO operation are determined, as shown in 710 the IO may be inserted into a sorted location of a device-specific queue according to the physical address tuple(s), in some embodiments. In addition to inserting the IO operation according to the physical address tuple(s), a priority of IO operations may be considered. For example, IO operations for customer or user workloads may be given priority over IO operations for background or maintenance workloads, in some embodiments. To support insertion of high priority IO operations, the device-specific queue may be reordered as needed to place the highest priority IO operations at the head of the device-specific queue, in some embodiments, where in other embodiments a pointer or other indicator of a virtual head of the device-specific queue may be updated such that the next operation in the queue to send to the storage device will indicated the highest priority IO operation.

Figure 8:
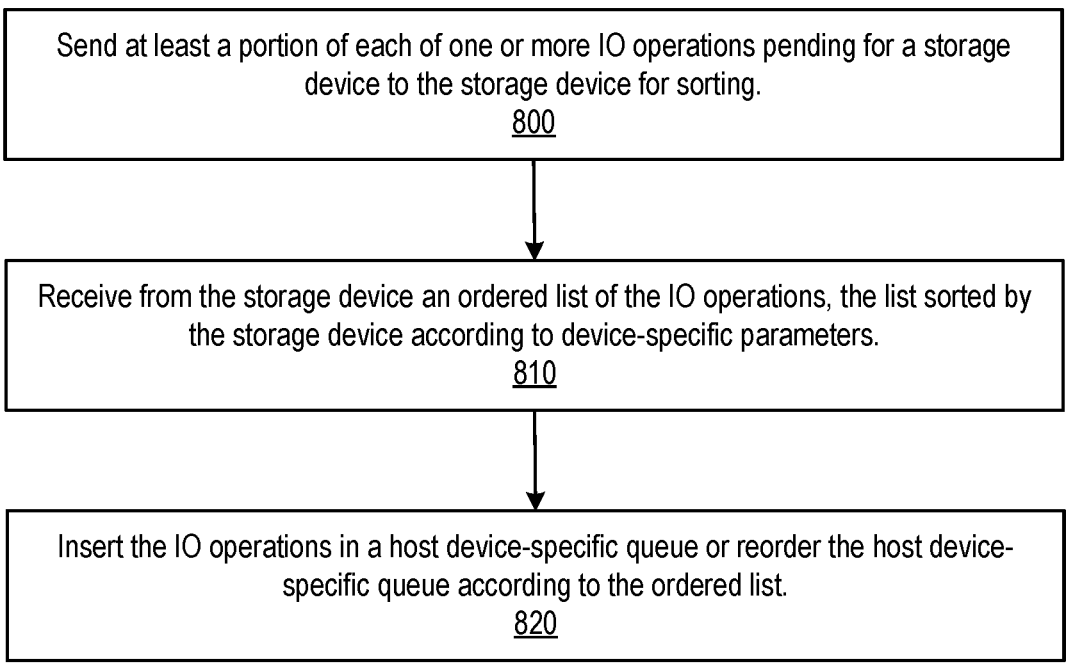
FIG. 8 is a high-level flow chart that illustrates various methods and techniques implementing inserting an input-output request into a host-side device-specific queue for a storage device using a sort order determined by the storage device, according to some embodiments.

FIG. 8 is a high-level flow chart that illustrates various methods and techniques to implement inserting an IO operation into a host-side device-specific queue for a storage device using a sort order determined by the storage device, according to some embodiments. As shown in 800, a host send at least a portion of one or more IO operations, including the IO operation, that are pending insertion into a host-side queue, such as the host queue 104 of FIG. 1, to the storage device for sorting. Included in the portion(s) sent may be LBA addresses and lengths to describe blocks or sectors to be accesses but may exclude data to be transferred or address locations of data requires to perform the IO operations. The storage device, upon receiving the IO operations, may order the IO operations according to data layout, performance information and other device-specific parameters to generate a sorted or ordered list of IO operations which are then sent back to, or made available to, the host device, as shown in 810, in various embodiments. Then, as shown in 820, the IO operation, and other IO operations, may be inserted in a host-side device-specific queue or the host-side queue may be reordered, according the ordered list generated by the storage device.

Figure 9:
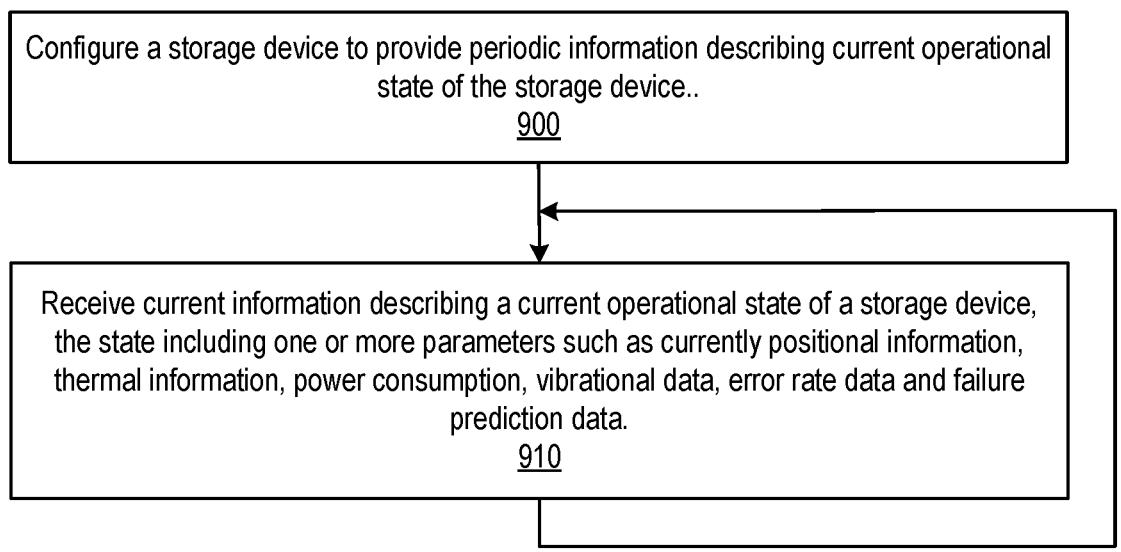
FIG. 9 is a high-level flow chart that illustrates various methods and techniques implementing obtaining runtime parameters from a storage device to optimize host-side device-specific queues, according to some embodiments.

FIG. 9 is a high-level flow chart that illustrates various methods and techniques implementing obtaining runtime parameters from a storage device to optimize host-side device-specific queues, according to some embodiments. As shown in 900, a storage device, such as the storage device 120 of FIG. 1, may be configured to provide periodic information describing current operational state of the storage device. This configuring may be performed during a reset or initialization of the storage device, in some embodiments, or as part of establishing a predictable access location for the storage device such as discussed in step 625 of FIG. 6. Other examples of initialization of the storage device may include disabling error recovery, sector remapping, or IO retry features of the storage device such that predictability of performance and access location may be ensured, in various embodiments.

Examples of current operational state of the storage device may include positional or location parameters, thermal measurements, vibration measurements and other environmental data, error rates or statistics, updates to remapping information and power consumption data. These examples are not intended to be limiting and any number of current measurements and data may be imagined.

Then, as shown in 910, current information describing a current operational state of the storage device may be received periodically at the host system. This information may be periodically sent and received or may be sent as required due to detected events such as a remapping event, an error event or an environmental event, in various embodiments.

Figure 10:
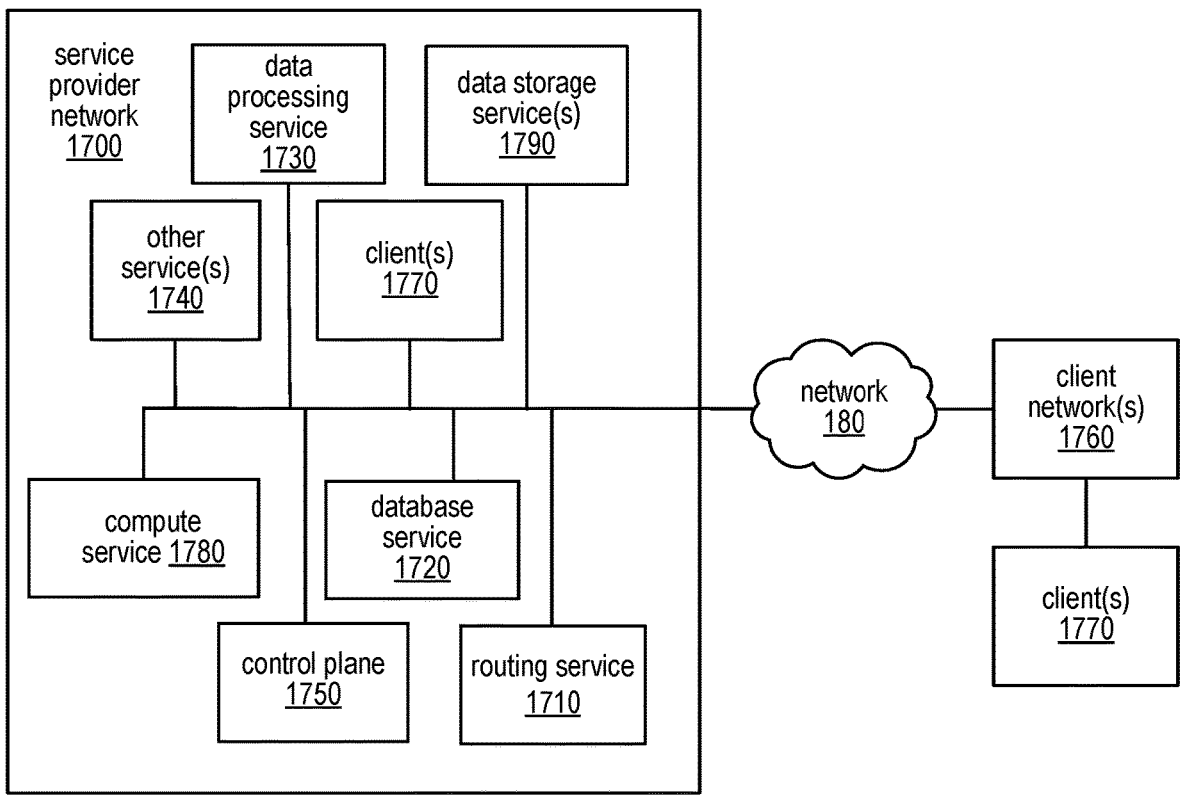
FIG. 10 illustrates an example provider network environment, according to at least some embodiments.

FIG. 10 illustrates an example provider network environment, according to at least some embodiments. Service provider network 1700 is illustrated as providing numerous services such as, but not limited to, a data processing service 1730, storage service(s) 1790 (e.g., data store, key-value store, short-term, long-term, or the like, etc.), database service 1720 (providing relational, non-relational database services, or both), compute service 1780 (e.g., providing virtual computing capabilities), a routing service 1710 and other services 1740, as well as clients 1770. Clients 1770 are illustrated as both external (communicably coupled via client networks 1760 and intermediate networks (e.g., the Internet or similar) to the service provider network) and internal to the service provider network. In some embodiments, one of the services of the service provider network may be a client of another one of the services.

Service provider network 1700 may be formed as a number of regions, where a region is a separate geographical area in which the cloud provider clusters data centers. Each region may include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone.

Preferably, availability zones within a region may be positioned far enough away from one other that the same natural disaster should not take more than one availability zone offline at the same time. Users may connect to availability zones of the service provider network 1700 via a publicly accessible network (e.g., the Internet, a cellular communication network). Regions are connected to a global network which includes private networking infrastructure (e.g., fiber connections controlled by the cloud provider) connecting each region to at least one other region. The service provider network 1700 may deliver content from points of presence outside of, but networked with, these regions by way of edge locations and regional edge cache servers. An edge location may be an extension of the cloud provider network outside of the traditional region/AZ context. For example an edge location may be a data center positioned to provide capacity to a set of customers within a certain latency requirement, a set of servers provided to a customer's premises, or a set of servers provided within (or forming part of) a cellular communications network, each of which may be controlled at least in part by the control plane of a nearby AZ or region. This compartmentalization and geographic distribution of computing hardware enables the service provider network 1700 to provide low-latency resource access to customers on a global scale with a high degree of fault tolerance and stability.

The traffic and operations of the cloud provider network may broadly be subdivided into two categories in various embodiments: control plane operations carried over a logical control plane 1750 and data plane operations carried over a logical data plane. While the data plane represents the movement of user data through the distributed computing system, the control plane 1750 represents the movement of control signals through the distributed computing system.

The control plane generally includes one or more control plane components distributed across and implemented by one or more control servers. Control plane traffic generally includes administrative operations, such as system configuration and management (e.g., resource placement, hardware capacity management, diagnostic monitoring, system state information).

The data plane includes customer resources that are implemented on the cloud provider network (e.g., compute instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, service provider network 1700 may include the hardware (e.g., modems, routers, switches, load balancers, proxy servers, etc.) and software (e.g., protocol stacks, accounting software, firewall/security software, etc.) necessary to establish a networking links between different components of service provider network 1700, such as computation and storage hosts, control plane components as well as external networks, such as network (e.g., the Internet). In some embodiments, service provider network 1700 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 1770 may be attached to the overlay network so that when a client provides an IP address that they want to send packets to, the IP address is run in virtual space by communicating with a mapping service that knows where the IP overlay addresses are.

Any of various computer systems may be configured to implement processes associated with a technique for data processing as discussed with regard to the various figures above. FIG. 11 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors.

The program instructions may implement the functionality described herein (e.g., the functionality of the feature deployment service, other services, edge devices, models, compute logic, and any other components/devices that implement the techniques described herein). The various methods as illustrated in the figures and described herein represent example embodiments of methods. The order of any method may be changed, and various elements may be added, reordered, combined, omitted, modified, etc.

Embodiments to implement deploying feature processing units to implement data processing features at a provider network and edge devices as described herein may be executed on one or more computer systems, which may interact with various other systems or devices. One such computer system is illustrated by FIG. 11. In different embodiments, computer system 1800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1800 includes one or more processors 1810 coupled to a system memory 1820 via an input/output (I/O) interface 1830. Computer system 1800 further includes a network interface 1840 coupled to I/O interface 1830, one or more storage devices 120 connected to the I/O interface 1830 through interconnect(s) 110 and one or more input/output devices such as cursor control device 1860, keyboard 1870, and display(s) 1880 connected through peripheral interfaces 1850. Display(s) may include standard computer monitor(s) and/or other display systems, technologies or devices, in one embodiment. In some embodiments, it is contemplated that embodiments may be implemented using a single instance of computer system 1800, while in other embodiments multiple such systems, or multiple nodes making up computer system 1800, may host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions, in one embodiment. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

In some embodiments, at least one processor 1810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1820 may store program instructions 1825 implementing device-specific operation queues and/or data accessible by processor 1810, in one embodiment. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the feature deployment service, other services, edge devices, models, compute logic, and any other components/devices, etc.) are shown stored within system memory 1820 as program instructions 1825 and data storage 1835, respectively. In other embodiments, program instructions and/or data may be received, sent or stored upon different types of computer-accessible media or on similar media separate from system memory 1820 or computer system 1800.

A computer-accessible medium may include non-transitory storage media or memory media such as magnetic or optical media, e.g., disk or CD/DVD-ROM coupled to computer system 1800 via I/O interface 1830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840, in one embodiment.

In one embodiment, I/O interface 1830 may be coordinate I/O traffic between processor 1810, system memory 1820, and any peripheral devices in the device, including network interface 1840 or other peripheral interfaces, such as input/output devices. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may allow data to be exchanged between computer system 1800 and other devices attached to a network, such as other computer systems, or between nodes of computer system 1800, in one embodiment. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or retrieving data by one or more computer system 1800, in one embodiment. Multiple input/output devices may be present in computer system 1800 or may be distributed on various nodes of computer system 1800, in one embodiment. In some embodiments, similar input/output devices may be separate from computer system 1800 and may interact with one or more nodes of computer system 1800 through a wired or wireless connection, such as over network interface 1840.

Figure 11:
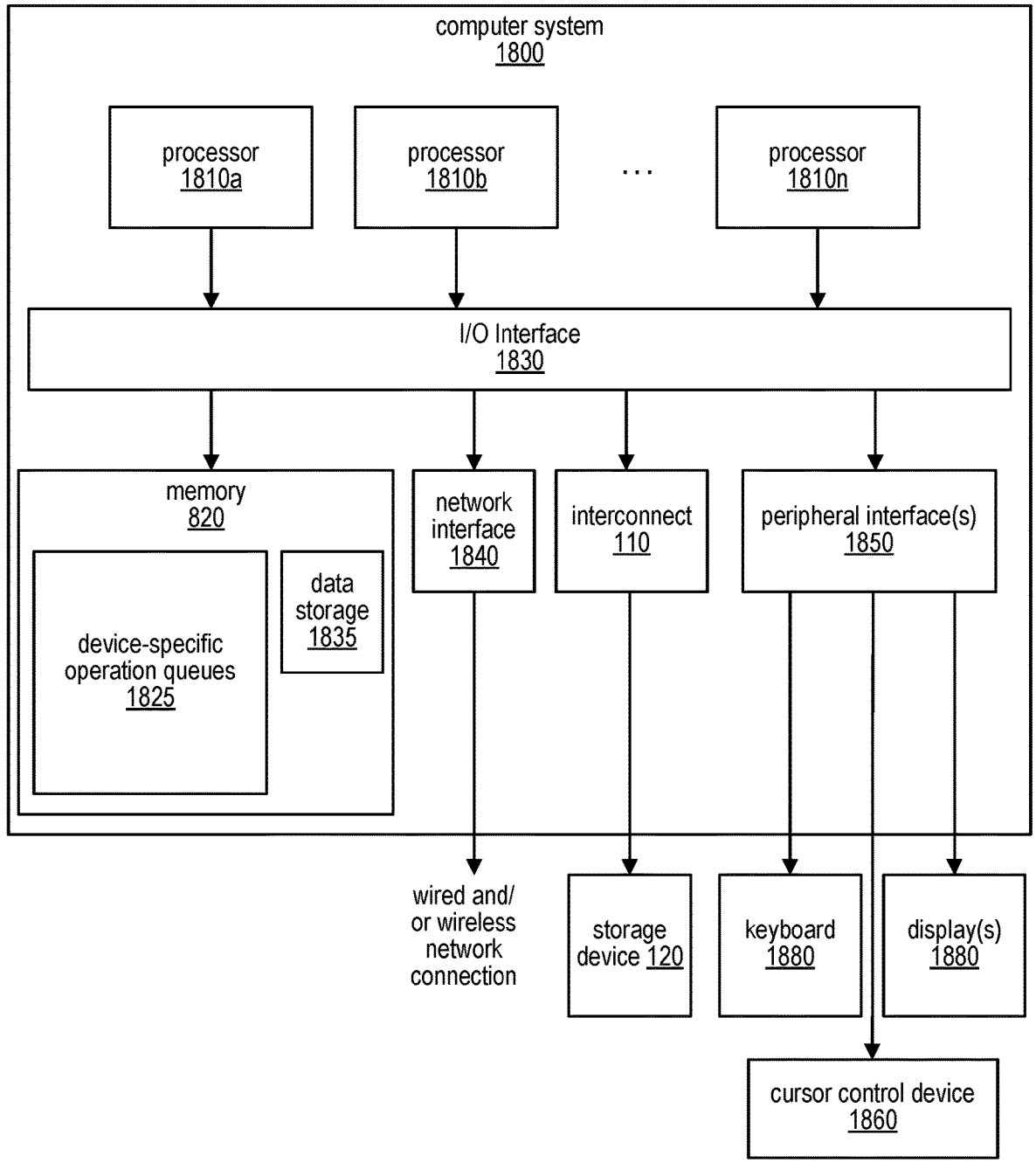
FIG. 11 is a block diagram illustrating an example computing system, according to some embodiments.

As shown in FIG. 11, memory 1820 may include program instructions 1825 that implement the various embodiments of the systems as described herein, and data store 1835, comprising various data accessible by program instructions 1825, in one embodiment. In one embodiment, program instructions 1825 may include software elements of embodiments as described herein and as illustrated in the Figures. Data storage 1835 may include data that may be used in embodiments (e.g., models, functions, compute logic, metadata, etc.). In other embodiments, other or different software elements and data may be included.

Those skilled in the art will appreciate that computer system 1800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 1800 may be transmitted to computer system 1800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a disk storage device; and
   a host computing system attached to the disk storage device, the host computing system comprising one or more processors and a memory storing program instructions that, when executed on the one or more processors, implement a storage interface configured to:
   receive a request to perform an input-output (IO) operation at the disk storage device connected to the host computing system;
   enqueue the received IO operation in an asynchronous queue maintained by the host computing system for the disk storage device, wherein the asynchronous queue comprises a plurality of IO operations in a sorted order, the sorted order optimized for the disk storage device, wherein a capacity of IO requests of the asynchronous queue is larger than a capacity of IO requests of an input queue maintained within the disk storage device, and wherein maintaining the asynchronous queue comprises sorting the asynchronous queue according to one or more parameters specific to the disk storage device; and responsive to an indication that the disk storage device is ready to receive IO operations, send one or more IO operations of the plurality of IO operations to the disk storage device according to the sorted order.

2. The system of claim 1, wherein the one or more parameters comprise data layout information, performance metrics, error processing information and current state information of the disk storage device, wherein the one or more parameters are obtained from the disk storage device, wherein the data layout information comprise physical block information for a plurality of storage zones of the disk storage device, and wherein the current state information comprises one or more of:
 a position parameter;
 a thermal measurement;
 a vibration measurement;
 an error rate; and
 a power consumption measurement.

3. The system of claim 1, wherein the one or more parameters are obtained from a manufacturer of the storage device or from reading the one or more parameters from the disk storage device.

4. The system of claim 1, wherein to sort the queue according to the one or more parameters specific to the disk storage device, the storage interface is configured to:
 send respective portions of the individual operations of the plurality of IO operations in the queue to the disk storage device;
 receive, from the disk storage device, a list comprising the respective portions of the individual operations of the plurality of IO operations sorted according to the one or more parameters; and
 sort the queue according to the received list.

5. A computer-implemented method, comprising:
 receiving, at a computing device, a request to perform an input-output (IO) operation at a storage device connected to the computing device;
 enqueuing the received IO operation in a queue maintained by the computing device for the storage device, wherein the queue comprises a plurality of IO operations in a sorted order, the sorted order optimized for the storage device, wherein a capacity of IO requests of the queue is larger than a capacity of IO requests of an input queue maintained within the storage device, and wherein maintaining the queue comprises sorting the queue according to one or more parameters specific to the storage device; and
 responsive to an indication that the storage device is ready to receive IO operations, sending one or more IO operations of the plurality of IO operations to the storage device according to the sorted order.

6. The computer-implemented method of claim 5, further comprising obtaining, by the computing device, the one or more parameters from the storage device.

7. The computer-implemented method of claim 5, wherein the one or more parameters are provided by a manufacturer of the storage device.

8. The computer-implemented method of claim 7, wherein the one or more parameters comprise current state information of the storage device, wherein the one or more parameters are obtained from the storage device, and wherein the current state information comprises one or more of:
 a position parameter;
 a thermal measurement;
 a vibration measurement;
 an error rate; and
 a power consumption measurement.

9. The computer-implemented method of claim 5, further comprising:
 establishing a known state of the storage device responsive to one of:
  an initialization of the storage device;
  a detected error of the storage device; or
  a period of time elapsed since a previous established known state;
 wherein establishing the known state comprises sending a plurality of IO operations to the storage device, wherein individual operations of the plurality of IO operations access a same storage block.

10. The computer-implemented method of claim 5, wherein the IO operation comprises a logical address, and wherein the one or more IO operations sent to the storage device individually comprise respective physical addresses.

11. The computer-implemented method of claim 10, further comprising configuring the storage device to disable retries on detected errors of IO operations.

12. The computer-implemented method of claim 5, further comprising:
 receiving, at the computing device, another request to perform another input-output (IO) operation at the storage device; and
 responsive to determining according to the one or more parameters that a completion time of the other IO operation is above a threshold time, rejecting performance of the IO operation.

13. The computer-implemented method of claim 5, wherein sorting the queue according to the one or more parameters specific to the disk storage device comprises:
 sending, by the computing device, respective portions of the individual operations of the plurality of IO operations in the queue to the disk storage device;
 receiving, by the computing device from the disk storage device, a list comprising the respective portions of the individual operations of the plurality of IO operations sorted according to the one or more parameters; and
 sorting the queue according to the received list.

14. One or more non-transitory computer-accessible storage media storing program instructions that when executed on or across one or more computing devices cause the one or more computing devices to implement a programmatic interface for a disk storage device, the programmatic interface performing:
 receiving a request to perform an input-output (IO) operation at the disk storage device;
 enqueuing the received IO operation in an asynchronous queue as part of the programmatic interface, wherein the asynchronous queue comprises a plurality of IO operations in a sorted order, the sorted order optimized for the disk storage device, wherein a capacity of IO requests of the asynchronous queue is larger than a capacity of IO requests of an input queue maintained within the disk storage device, and wherein maintaining the asynchronous queue comprises sorting the asynchronous queue according to one or more criteria specific to the disk storage device; and
 responsive to an indication that the disk storage device is ready to receive IO operations, sending one or more IO operations of the plurality of IO operations to the disk storage device according to the sorted order.

15. The one or more non-transitory computer-accessible storage media of claim 14, the programmatic interface further performing obtaining the one or more criteria from the disk storage device.

16. The one or more non-transitory computer-accessible storage media of claim 14, wherein the one or more criteria are provided by a manufacturer of the disk storage device.

17. The one or more non-transitory computer-accessible storage media of claim 14, wherein the one or more criteria comprise current state information of the disk storage device, wherein the one or more criteria are obtained from the disk storage device, and wherein the current state information comprises one or more of:
- a position parameter;
- a thermal measurement;
- a vibration measurement;
- an error rate; and
- a power consumption measurement.

18. The one or more non-transitory computer-accessible storage media of claim 14, wherein the IO operation comprises a logical address, and wherein the one or more IO operations sent to the disk storage device individually comprise respective physical addresses.

19. The one or more non-transitory computer-accessible storage media of claim 14, the programmatic interface further performing:

receiving another request to perform another input-output (IO) operation at the disk storage device; and responsive to determining according to the one or more criteria that a completion time of the other IO operation is above a threshold time, rejecting performance of the IO operation.

20. The one or more non-transitory computer-accessible storage media of claim 14, wherein sorting the queue according to the one or more criteria specific to the disk storage device comprises:

sending, respective portions of the individual operations of the plurality of IO operations in the queue to the disk storage device;

receiving, from the disk storage device, a list comprising the respective portions of the individual operations of the plurality of IO operations sorted according to the one or more criteria; and sorting the queue according to the received list.

* * * * *